United States Patent [19]

Hasegawa et al.

[11] Patent Number: 4,671,896
[45] Date of Patent: Jun. 9, 1987

[54] FLAME-RETARDANT COMPOSITION AND FLAME-RETARDANT CABLE USING SAME

[75] Inventors: Masatake Hasegawa, Tokyo; Hirotada Kobayashi, Sakura; Hideo Sunazuka, Kamagaya; Akira Yoshino, Shizuoka; Takao Matsuda, Mishima; Yoshioki Shingo, Numazu, all of Japan

[73] Assignee: Fujikura Ltd., Tokyo, Japan

[21] Appl. No.: 707,410

[22] Filed: Mar. 1, 1985

[30] Foreign Application Priority Data

Aug. 14, 1984 [JP] Japan .................... 59-169766
Aug. 14, 1984 [JP] Japan .................... 59-169767

[51] Int. Cl.$^4$ ............................................. C09K 3/28
[52] U.S. Cl. .................... 252/609; 428/921; 174/121 A; 106/18.11; 106/18.14; 106/18.26
[58] Field of Search ............. 252/609, 601; 428/921; 174/121 A; 106/18.11, 18.14, 18.26

[56] References Cited

U.S. PATENT DOCUMENTS

| 4,209,566 | 6/1980 | Betts et al. | 252/609 |
| 4,396,730 | 8/1983 | Imahashi | 252/609 |
| 4,430,470 | 2/1984 | Tamauchi et al. | 252/609 |
| 4,505,850 | 3/1985 | Pearson | 252/601 |
| 4,549,041 | 10/1985 | Shingo et al. | 252/609 |

FOREIGN PATENT DOCUMENTS 0170176  9/1984  Japan .................... 252/609
1479083 10/1975  United Kingdom .

Primary Examiner—John F. Terapane
Assistant Examiner—Susan Wolffe
Attorney, Agent, or Firm—Oblon, Fisher, Spivak, McClelland & Maier

[57] ABSTRACT

A flame-retardant composition is prepared by mixing 100 parts by weight of a rubber or plastics free from any halogen with about 50 to about 200 parts by weight of magnesium hydroxide having an average particle diameter of about 0.3 to about 2 μm and about 5 to about 50 parts by weight of carbon black powder having an oil absorption of about 0.5 to about 2.0 ml/g, and then cross-linking the mixture with an organic peroxide, sulfur, or a sulfur compound as a vulcanizing agent. By forming an electrical insulation and/or a sheath of the flame-retardant composition, there is provided a flame-retardant cable of the type including a cable core composed of an electric conductor coated with the electrical insulation or a plurality of such cores twisted together and covered, together with a filler, with the sheath. The flame-retardant composition and the flame-retardant cable using this composition possess high flame resistance while possessing acceptable mechanical properties and will not evolve any hydrogen halide or other noxious gas if burnt. With less smoke emission than conventional cables on fire, the composition and the cable are less hazardous.

20 Claims, 2 Drawing Figures

FLAME-RETARDANT COMPOSITION AND FLAME-RETARDANT CABLE USING SAME

The present invention relates to a halogen-free flame-retardant composition and further relates to a flame-retardant cable using the composition.

Conventional methods of imparting flame retardancy to ordinary cables include: (1) the adoption of a cable insulation or sheath made of a highly flame-retardant resin containing a halogen such as chlorine or bromine, e.g., polyvinyl chloride (PVC), polychloroprene rubber, chlorosulfonated polyethylene rubber, or chlorinated polyethylene, or of such a resin plus an antimony oxide or other similar flame retardant for added retardancy; (2) the use of an insulation or sheath of a composition consisting of a flammable resin, e.g., polyethylene, ethylene-vinyl acetate copolymer (EVA), ethylene-ethyl acrylate (EEA), or ethylene propylene rubber (EPR), and a flame retardant containing a halogen such as chlorine or bromine and combined with an antimony oxide; and (3) the employment of aluminum hydroxide rather than a halogen-containing flame retardant as a principal retardant to be added to a flammable resin.

The methods (1) and (2), whereby a cable insulation or sheath is formed of a halogen-containing resin with or without the addition of a flame retardant, offer problems of metal corrosion and harmful effects on human with large volumes of hydrogen halide gases such as hydrogen chloride (HCl) or hydrogen bromide (HBr), e.g., evolved upon combustion of the resin and retardant. Heavy smoke emission that results from the combustion is another knotty problem. Thus, these flame-retardant compositions and flame-retardant cables using the compositions are not quite harmless. They therefore cannot be used in subways, underground markets, hospitals, office buildings, ships, nuclear power plants, chemical plants, and other installations where safety is an important consideration.

The last method (3) that employs aluminum hydroxide as a principal flame retardant to be added to a flammable resin, unlike the methods (1) and (2), does not cause evolution of noxious gas or smoke. If higher flame retardancy is to be attained, however, the composition must have a larger proportion of aluminum hydroxide. This, in turn, leads to inferior mechanical and/or electrical properties of the resulting flame-retardant composition itself or of the flame-retardant cable sheath or insulation made of the particular composition. Among other disadvantages is the possibility of undesirable refoaming of the composition during the course of processing such as extrusion.

The present invention is aimed at solving all the aforedescribed problems of the prior art. One aspect of the invention is directed to a flame-retardant composition prepared by mixing 100 parts by weight of halogen-free rubber or plastics with about 50 to about 200 parts by weight of magnesium hydroxide having an average particle diameter of about 0.3 to about 2 $\mu$m and about 5 to about 50 parts by weight of carbon black powder having an oil absorption of about 0.5 to about 2.0 ml/g, and then cross-linking the mixture with an organic peroxide, sulfur, or a sulfur compound as a vulcanizing agent.

According to another aspect of the invention, a flame-retardant cable is provided which includes a cable core composed of an electric conductor coated with an electrical insulation or a plurality of such cores twisted together and covered, together with a filler, with a sheath, said insulation and/or said sheath being made of a flame-retardant composition prepared by mixing 100 parts by weight of halogen-free rubber or plastics with about 50 to about 200 parts by weight of magnesium hydroxide having an average particle diameter of about 0.3 to about 2 $\mu$m and about 5 to about 50 parts by weight of carbon black powder having an oil absorption of about 0.5 to about 2.0 ml/g, and then cross-linking the mixture with an organic peroxide, sulfur, or a sulfur compound as a vulcanizing agent.

The flame-retardant composition and the flame-retardant cable using the same in accordance with the present invention, as noted above, possess high flame resistance, and the composition itself is free from any halogen, comprising a halogen-free rubber or plastics as the base resin and halogen-free additives. Consequently, if burnt in a fire or other hazard, the cable will not evolve any hydrogen halide or other noxious gas. The combustion gases from the burning cable will not corrode metals in the neighborhood nor have a harmful effect on human. With less smoke emission than conventional cables afire, the cable of the invention is safer from hazards. An additional advantage is its good mechanical properties.

The rubber and plastics to be used in the present invention are free from any halogen. Examples are polyethylene (PE), natural rubber, butyl rubber, silicone rubber, ethylene propylene rubber (EPR), ethylene propylene diene elastomer (EPDM), ethylene-vinyl acetate copolymer, ethylene-ethyl acrylate copolymer, ethylene-$\alpha$-olefin copolymer, ethylene acrylic elastomer, hydrogenated styrene-butadiene elastomer, polyester elastomer and their blends. In order to attain high tensile strength and other favorable mechanical properties, it is desirable to use a polyolefin resin having an ethylene content of at least 90% or a combination of two or more such resins.

The flame-retardant composition according to the present invention includes magnesium hydroxide having an average particle diameter of about 0.3 to about 2 $\mu$m. Magnesium hydroxide less than about 0.3 $\mu$m in diameter has such great cohesive force that it does not disperse thoroughly in the mixture and exercises adverse effects on the mechanical and other properties of the resulting composition. A size larger than about 2 $\mu$m is again undesirable because the particles have a reduced overall surface area, leading to inadequate mechanical properties, such as low tensile strength and elongation, of the composition. When magnesium hydroxide powdered to a size within the specified range is employed, a relatively high degree of filling is possible with little sacrifice of mechanical properties and extrudability of the resulting composition, and high filling produces high flame retardancy. In the present invention, magnesium hydroxide is added in an amount of about 50 to about 200 parts by weight per 100 parts by weight of the rubber or plastics. With less than about 50 parts by weight of the hydroxide it is impossible to achieve an adequate flame-retardant effect. Over about 200 parts by weight is so much that the composition has deteriorated mechanical properties and foams on extrusion or becomes hardly processable. In the case of magnesium hydroxide, the temperature at which its water of crystallization is released is around 370° C., or higher than that of aluminum hydroxide (about 200° C., the temperature being below the processing temperature of certain resins and hence a factor limiting the choice of the resin to be employed). The higher crystal-water-release temperature is so close to the thermal decomposition point of the base resin that it puts practically no limitation to the temperature at which magnesium hydroxide is mixed with the resin and to the extrusion temperature of the resulting composition. Surface treatment of magnesium hydroxide with stearic or oleic acid makes possible an even greater degree of filling and imparts better processability to the composition.

The carbon black to be used in the present invention is specified to have an oil absorption of about 0.5 to about 2.0 ml/g, because it permits the composition to combine a high flame-retardant effect with good processability and excellent mechanical properties. With an oil absorption of less than about 0.5 ml/g, the carbon black produces low tensile strength and insufficient flame-retardant effect due to a limited overall surface area of the particles. If the oil absorption exceeds about 2.0 ml/g, the mixture becomes too viscous to work and lowers the electrical insulation properties of the composition.

In the present invention the carbon black is added in an amount of about 5 to about 50 parts by weight per 100 parts by weight of the rubber or plastics. With less than about 5 parts by weight of the carbon black, it is impossible to achieve flame-retarding and carbonized-layer-forming effects as desired. With more than about 50 parts by weight, the mixture becomes too viscous to process or results in low elongation of the product. When the flame-retardant composition is caused to burn, the carbon black contained therein is heated in an oxygen-free state and, in a process of carbonization, it forms a carbonized layer within the composition. The carbonized layer so formed, in turn, effectively prevents the flow of the composition itself and the outflow of flammables (dripping of the melt) from the inside of the cable, thereby controlling the spread of fire.

Useful vulcanizing agents for the present invention include, among peroxides, dicumyl peroxide (DCP), 2,5-dimethyl-2,5-di(t-butylperoxyne)hexane, 2,5-dimethyl-2,5-di(t-butylperoxy)-hexyne, and t-butylperbenzoate. Other usable vulcanizing agents include sulfur and sulfur compounds combined with thiuram vulcanizers. The flame-retardant composition according to the present invention, cross-linked with such a vulcanizing agent, exhibits excellent mechanical properties.

Desirably, in practicing the invention, red phosphorus is added to the flame-retardant composition in an amount of about 2 to about 15 parts by weight per 100 parts by weight of the rubber or plastics. If the amount is less than about 2 parts by weight, the phosphorus achieves practically no carbonization-accelerating effect. Conversely, an excessive addition, more than about 15 parts by weight, brings about reduced flame retardancy and increased smoke emission. Addition of a specified amount of red phosphorus further promotes the carbonization inside the flame-retardant composition being caused to burn. This is ascribable to the fact that, as it is oxidized by heating at elevated temperature, phosphorus by nature deprives the resin of its hydrogen and helps the resin to carbonize through the dehydration reaction. The dehydration and carbonization are effected with only a small amount of red phosphorus, preferably in combination with the above-mentioned magnesium hydroxide. In rendering a base resin flame-retardant, desirable materials according to the invention, viz., magnesium hydroxide of a particular particle size, carbon black with a particular oil absorption, and red phosphorus, are used. As a consequence, the composition gives off less smoke on combustion than ordinary flame retardants containing chlorine, bromine, or other halogen.

It is further desirable to add to the above mixture about 3 to about 10 parts by weight each of an organopolysiloxane and a basic lead compound of the formula $xPbO.Pb(R).yH_2O$ per 100 parts by weight of the rubber or plastics, where $0 \leq x \leq 3$, R is a sulfuric acid group, a higher fatty acid group or an aromatic carboxylic acid group, the higher fatty acid group and the aromatic carboxylic acid group each having 6 or more carbon atoms, and $0 \leq y \leq 10$. Useful organopolysiloxanes include, for example, dimethylpolysiloxane, methylphenylpolysiloxane, and methylvinylpolysiloxane. The basic lead compound may, e.g., be tribasic lead sulfate, dibasic lead phthalate, or basic lead stearate. Less than about 3 parts by weight each of the organopolysiloxane and the basic lead compound scarcely prove effective in increasing the flame retardancy. On the other hand, more than about 10 parts by weight of each additive or too large a combined proportion of the two additives will reduce the tensile strength of the composition. The flame retardancy is not quite improved for the proportions of the expensive additives, and this is undesirable in view of the cost.

Figure 1:
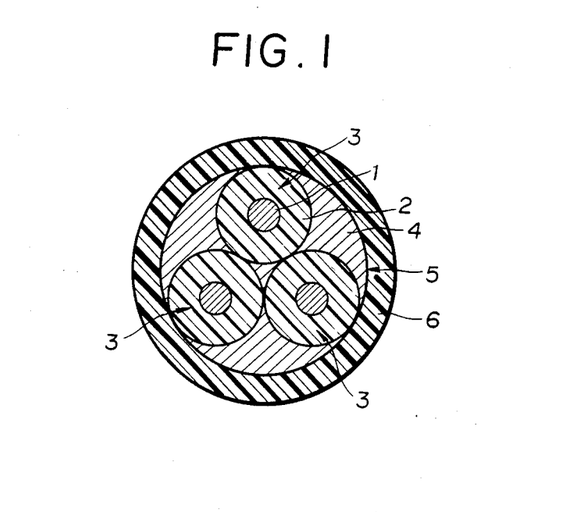
FIGS. 1 and 2 are cross-sectional views of flame-retardant cables using flame-retardant compositions as embodiments of the invention.

A flame-retardant cable using the afore-described flame-retardant composition according to the invention will now be explained with reference to FIG. 1. In the figure the reference numeral 1 designates an electric conductor coated entirely with an electric insulation 2 by conventional extrusion to form a subcore 3. The insulation 2 is made of either the flame-retardant composition or one of the halogen-free rubbers or plastics. Three subcores 3, each formed in the manner described, are twisted together conventionally with a filler 4 of paper tape, jute, or the like to make up a core 5. Over this core 5 is formed a sheath 6 of the flame-retardant composition according to the invention in the usual manner by extrusion.

Figure 2:
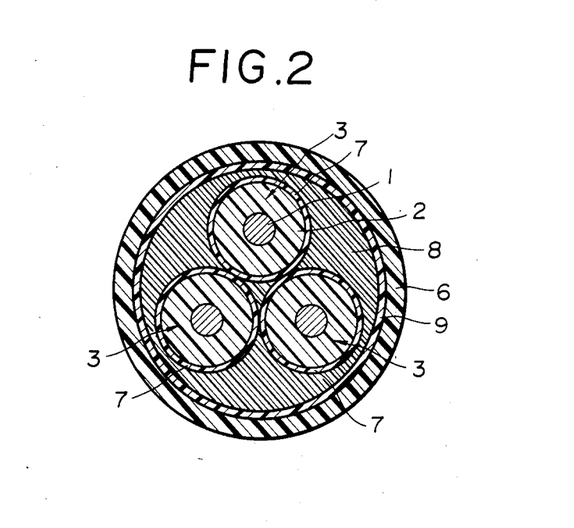

FIG. 2 illustrates another embodiment of the flame-retardant cable using the flame-retardant composition of the invention. Elements like those of the cable in FIG. 1 are given like numerals and the explanation is not reiterated here. In the flame-retardant cable of this modified structure, a core tape 7, such as sold under the trademark "Mylar", is wound around each subcore 3. Three such subcores 3, with the core tape 7 wound thereon, are twisted together, and the filler 8 is extruded over the twisted subcores. The filler 8 is of a solid type formed of a flame-retardant composition free from any halogen and having an oxygen index of at least 30. Where the solid filler is to be employed, it is a preferred practice to wind the core tape 7 of Mylar or the like over the subcores 3 so as to avoid fusion between the filler and the cores. Likewise a hold-down tape 9 of Mylar or the like is wound around the solid filler 8. However, the hold-down tape 9 is not necessarily used. The filler of the halogen-free flame-retardant composition having an oxygen index of at least 30, as used in the embodiment being described, combines with the sheath and/or the insulation formed of the flame-retardant composition in conformity with the invention to confer even greater flame retardancy on the cable.

Although the cables of the invention illustrated are of multiple-conductor types, it is to be understood that the invention is not limited to the specific embodiments thereof but is applicable to single-conductor types as well.

EXAMPLES 1-10 and COMPARATIVE EXAMPLES 1-10

TABLE 1 presents a summary of Examples 1 through 10 for preparing flame-retardant compositions in accordance with the invention, giving their constitutions and property test results. TABLE 2 summarizes the constitutions and property test results of compositions which do not fall within the scope of the present invention and ordinary polyvinyl chloride compositions as Comparative Examples 1 to 10. Each sample, shown in TABLES 1 and 2, except for Comparative Examples 6 and 7 was prepared by mixing a composition by means of a roll mill at 110° C. and then by hot press cross-linking it at 160° C. for 30 minutes to thereby form a sheet of 2 mm thickness.

As can be seen from TABLE 1, the flame-retardant compositions of Examples 1 to 10 that were within the scope of this invention exhibited excellent qualities in mechanical properties, processability, smoke emission and flame-retardancy.

On the other hand, TABLE 2 reveals the following facts. In Comparative Example 1 the proportion of magnesium hydroxide was so small that the resulting composition was not adequately flame-retardant and burned in the air. Conversely in Comparative Example 2, too much magnesium hydroxide reduced the processability and elongation of the composition. In the third example excessive carbon black again affected the processability and elongation unfavorably. Comparative Example 4 used a carbon of a structure with a low oil absorption (0.4 ml/g), thus resulting in low tensile strength and flame-retardant effect. The same applied when excessive red phosphorus was used as in Comparative Example 5 (where the red phosphorus content was 17 wt. %). Comparative Examples 6 and 7 employed conventional chlorine-containing compositions for cable sheathing, i.e., a flame-retardant PVC composition and a flame-retardant low-HCl PVC composition, which were prepared as shown in TABLE 2A and which were balanced in respect of the OI and tensile strength but were productive of smoke and, above all, hydrogen halide gases. These compositions were undesirable because of their corrosiveness and toxicity.

TABLE 2A

|  | COMPARATIVE EXAMPLE (wt. parts) | |
|---|---|---|
|  | 6 | 7 |
| PVC resin ($\bar{P}$ = 1100) | 100 | 100 |
| (DOP) plasticizer | 50 | 60 |
| Stabilizer (DLF) | 4 | 4 |
| Sb$_2$O$_3$ | 10 | 10 |
| CaCO$_3$ | — | 50 |

Comparative Example 8 used a carbon having high oil absorption and the resulting composition was high in Mooney viscosity and hence was poor in processability. Comparative Example 9 used Mg(OH)$_2$ having a small average particle diameter, resulting in a composition having a small elongation and poor processability. Comparative Example 10 adopted Mg(OH)$_2$ having a large average particle diameter and the resulting composition was poor in tensile strength and elongation.

EXAMPLES 11-14 AND COMPARATIVE EXAMPLES 11-15

Each sample of which composition is given in TABLES 3 and 4 was prepared in the same manner as in the preceding examples.

As is obvious from TABLE 3, the flame-retardant compositions according to the invention exhibited excellent qualities in mechanical properties, processability, smoke emission and flame-retardancy.

TABLE 4 indicates the following. In Comparative Example 11 where the combined amount of the organopolysiloxane and the basic lead compound was excessive, the resulting composition had reduced tensile strength and rather inadequate flame retardancy. Comparative Example 12 employed a bromine-containing flame retardant (decabromodiphenyl oxide), when large volumes of hydrogen bromide gas and smoke were evolved. Comparative Examples 13 and 14 used conventional chlorine-containing compositions for cable sheathing, i.e., a flame-retardant PVC composition and a flame-retardant low-HCL PVC composition respectively, of which compositions are same as those of Comparative Examples 6 and 7 respectively shown in TABLE 2A. These samples possessed balanced OI and tensile strength but produced so much smoke and hydrogen halide gases that they were undesirably corrosive and toxic. Comparative Example 15 used both organopolysiloxane and tribasic lead sulfate in small amounts, resulting in a composition being poor in flame-retardancy.

EXAMPLES 15-19 AND COMPARATIVE EXAMPLES 16-21

TABLE 5 summarizes Examples 15 to 19 showing flame-retardant cables according to the present invention, and the structures and property test results of those cables. TABLE 6 gives the structures and property test results of cables using compositions outside the scope of the invention and of an ordinary polyvinyl chloride composition as Comparative Examples 16 to 21. Each sample cable was prepared in the similar manner as illustrated in connection with the embodiments shown in FIGS. 1 and 2.

It is clear from TABLE 5 that all the flame-retardant cables of the invention met the IEEE Std. 383. The cables were finished with good appearance, evolved no hydrogen chloride gas but a negligible volume of smoke, attaining see-through distances of at least 100 meters in all cases. The results suggested the advisability of employing a flame-retardant solid filler where high flame retardancy is to be achieved.

TABLE 6, by contrast, shows that cables using sheaths of a low oxygen index as in Comparative Examples 16 and 17 were unacceptable. Even with an insulation having an oxygen index (OI) of 26 as in Comparative Example 17, the cable was not passable. The cable of Comparative Example 18 passed the combustion tests, but a high degree of filling adversely affected the processability and gave a defective product with a poor appearance of seriously roughened surface. Comparative Example 19 to 21 all employed PVC sheaths. Although the cables passes the combustion tests, they produced a large volume of hydrogen chloride gas, corroded metals and proved harmful to human in case of a fire. They also gave off much smoke.

EXAMPLES 20–22 and COMPARATIVE EXAMPLES 22–25

TABLE 7 shows flame-retardant cables according to Examples 20 to 22 of the present invention, together with their property test results. TABLE 8 likewise shows, as Comparative Examples 22 to 25, cables using compositions outside the scope of the present invention and an ordinary polyvinyl cable composition, and their property test results. Each sample cable was prepared in the similar manner as in the preceding Examples 11–14 and 11–15.

TABLE 1

| | EXAMPLE | | | | | | | | | |
|---|---|---|---|---|---|---|---|---|---|---|
| | 1 | 2 | 3 | 4 | 5 | 6 | 7 | 8 | 9 | 10 |
| Components, parts by weight | | | | | | | | | | |
| Ethylene-α-olefin copolymer[*1] | 100 | 100 | 100 | 100 | 100 | 100 | 100 | 100 | 100 | 100 |
| $Mg(OH)_2$[*2] | — | — | — | 100 | 150 | — | — | — | — | — |
| Surface-treated $Mg(OH)_2$[*3] | 50 | 100 | 150 | — | — | 200 | 100 | 100 | 100 | 150 |
| Carbon Black[*4] | 50 | 20 | 20 | 20 | 20 | — | — | — | — | — |
| Carbon Black[*13] | — | — | — | — | — | 5 | 20 | 20 | 20 | 20 |
| Red phosphorus-contg. flame retardant[*5] | — | — | — | — | — | — | 10 | 30 | — | — |
| Antioxidant[*6] | 2 | 2 | 2 | 2 | 2 | 2 | 2 | 2 | 2 | 2 |
| Dicumyl peroxide | 2 | 2 | 2 | 2 | 2 | 2 | 2 | 2 | 2 | 2 |
| Property test results | | | | | | | | | | |
| Tensile strength (kg/mm$^2$)[*7] | 1.6 | 1.4 | 1.2 | 1.2 | 1.0 | 1.0 | 1.2 | 1.0 | 1.6 | 1.0 |
| Elongation (%)[*7] | 570 | 520 | 470 | 420 | 370 | 360 | 510 | 480 | 520 | 500 |
| OI (oxygen index)[*8] | 26 | 28 | 33 | 26 | 33 | 39 | 30 | 35 | 29 | 27 |
| Hydrogen halide gases (mg/g)[*9] | 0 | 0 | 0 | 0 | 0 | 0 | 0 | 0 | 0 | 0 |
| Copper mirror corrosion test. corroded area (%)[*10] | 0 | 0 | 0 | 0 | 0 | 0 | 0 | 0 | 0 | 0 |
| Mooney viscosity at 100° C.[*11] | 40 | 25 | 30 | 42 | 57 | 45 | 24 | 26 | 30 | 25 |
| Smoke emission, D(m$^{-1}$)[*12] | 0.7 | 0.6 | 0.5 | 0.6 | 0.5 | 0.4 | 0.8 | 0.9 | 0.6 | 0.5 |

Notes:
[*1]Polyolefin resin having an ethylene content of at least 90% and sold under the tradename "TAFUMER A-4085" by Mitsui Petrochmical Ind. Ltd., Japan;
[*2]Magnesium hydroxide not surface-treated, having an average particle diameter of 2 μm;
[*3]Magnesium hydroxide surface-treated with a stearic acid, with an average particle diameter of 0.3 μm;
[*4]Having a structure such that the oil absorption is 1.2 ml/g (HAF);
[*5]Flame retardant containing 24 wt. % of red phosphorus;
[*6]Manufactured and sold by Chiba-Geigy, Switzerland, under the tradename "Irganex # 1076";
[*7]According to ASTM D-638;
[*8]According to ASTM D-2863;
[*9]According to IEC 754-1;
[*10]According to ASTM D-2671;
[*11]$ML_{1+4}$ min. value;
[*12]Measured in conformity with JIS A-1306. Smoke conc. D = 1/L $\log_{10} Io/I$ where L is length of light path (m), I is light intensity with smoke and Io is light intensity without smoke;
[*13]Having a structure such that the oil absorption is 1.2 ml/g (HAF) for Examples 6–8, 2.0 ml/g (ISAF-HS) for Example 9 and 0.5 ml/g (FF) for Example 10.

TABLE 2

| | COMPARATIVE EXAMPLE | | | | | | | | | |
|---|---|---|---|---|---|---|---|---|---|---|
| | 1 | 2 | 3 | 4 | 5 | 6 | 7 | 8 | 9 | 10 |
| Components, parts by weight | | | | | | | | | | |
| Ethylene-α-olefin copolymer[*1] | 100 | 100 | 100 | 100 | 100 | — | — | 100 | 100 | 100 |
| Surface-treated $Mg(OH)_2$[*3] | 30 | 250 | 100 | 100 | 100 | | | | | |
| Surface-treated $Mg(OH)_2$[*14] | | | | | | — | — | 150 | 100 | 100 |
| Carbon Black[*13] | 3 | 10 | 70 | 20 | 20 | | | | | |
| Carbon Black[*15] | | | | | | — | — | 40 | 20 | 20 |
| Red phosphorus-contg. flame retardant[*5] | — | — | — | — | 70 | — | — | — | — | — |
| Antioxidant[*6] | 2 | 2 | 2 | 2 | 2 | — | — | 2 | 2 | 2 |
| Dicumyl peroxide | 2 | 2 | 2 | 2 | 2 | — | — | 2 | 2 | 2 |
| Property test results | | | | | | | | | | |
| Tensile strength (kg/mm$^2$)[*7] | 1.8 | 0.6 | 0.8 | 0.8 | 0.7 | 2.5 | 1.6 | 1.8 | 1.2 | 0.7 |
| Elongation (%)[*7] | 620 | 190 | 230 | 570 | 320 | 300 | 360 | 450 | 220 | 280 |
| OI (oxygen index)[*8] | 21 | 43 | 30 | 24 | 30 | 35 | 30 | 35 | 30 | 25 |
| Hydrogen halide gases (mg/g)[*9] | 0 | 0 | 0 | 0 | 0 | 270 | 80 | 0 | 0 | 0 |
| Copper mirror corrosion test. corroded area (%)[*10] | 0 | 0 | 0 | 0 | 0 | 100 | 21 | 0 | 0 | 0 |
| Mooney viscosity at 100° C.[*11] | 20 | 71 | 64 | 23 | 52 | — | — | 75 | 82 | 48 |
| Smoke emission, D(m$^{-1}$)[*12] | 1.6 | 0.3 | 0.5 | 0.5 | 2.1 | 2.6 | 2.0 | 0.7 | 0.6 | 0.9 |

Note:
[*1], [*2], [*3], [*5]–[*12]Same as in TABLE 1;
[*13]Having a structure such that the oil absorption is 1.2 ml/g (HAF) for Comparative Examples 1–3 and 5 and 0.4 ml/g (FT) for Comparative Example 4.
[*14]Magnesium hydroxide surface-treated with a stearic acid, with an average particle diameter of 0.3 μm for Comparative Example 8, an average particle diameter of 0.2 μm for Comparative Example 9 and an average particle diameter of 3 μm for Comparative Example 10;
[*15]Having a structure such that the oil absorption is 1.2 ml/g (HAF) for Comparative Examples 9 and 10 and 2.5 ml/g (ECF) for Comparative Example 8.

TABLE 3

| Components, parts by weight | EXAMPLE 11 | 12 | 13 | 14 |
|---|---|---|---|---|
| Ethylene-α-olefin copolymer*1 | 100 | 100 | 100 | 100 |
| Mg(OH)$_2$*2 | — | — | — | — |
| Surface-treated Mg(OH)$_2$*3 | 100 | 100 | 100 | 100 |
| Carbon Black*4 | 20 | 20 | 20 | 20 |
| Red phosphorus-contg. flame retardant*5 | — | — | 30 | 30 |
| Organopolysiloxane*16 | 3 | 5 | 5 | 10 |
| Tribasic lead sulfate | 3 | — | 5 | 10 |
| Dibasic lead phthalate | — | 5 | — | — |
| Antioxidant*6 | 2 | 2 | 2 | 2 |
| Dicumyl peroxide | 2 | 2 | 2 | 2 |
| Property test results | | | | |
| Tensile strength (kg/mm$^2$)*7 | 1.3 | 1.3 | 1.0 | 1.0 |
| Elongation (%)*7 | 500 | 505 | 480 | 420 |
| OI (oxygen index)*8 | 36 | 37 | 43 | 45 |
| Hydrogen halide gases (mg/g)*9 | 0 | 0 | 0 | 0 |
| Copper mirror corrosion test. corroded area (%)*10 | 0 | 0 | 0 | 0 |
| Mooney viscosity at 100° C.*11 | 23 | 23 | 28 | 35 |
| Smoke emission, D(m$^{-1}$)*12 | 0.5 | 0.5 | 0.7 | 0.6 |

Note: *1–*12 Same as in EXAMPLE 1;

TABLE 4

| Components, parts by weight | COMPARATIVE EXAMPLE 11 | 12 | 13 | 14 | 15 |
|---|---|---|---|---|---|
| Ethylene-α-olefin copolymer*1 | 100 | 100 | — | — | 100 |
| Surface-treated Mg(OH)$_2$*3 | 100 | 100 | — | — | 100 |
| Carbon Black*4 | 20 | 20 | — | — | — |
| Organopolysiloxane*16 | 20 | — | — | — | 2 |
| Tribasic lead sulfate | 20 | 5 | — | — | 2 |
| Decabromodiphenyl oxide*17 | — | 40 | — | — | — |
| Sb$_2$O$_3$ | — | 20 | — | — | — |
| Antioxidant*6 | 2 | 2 | — | — | 2 |
| Dicumyl peroxide | 2 | 2 | — | — | 2 |
| Property test results | | | | | |
| Tensile strength (kg/mm$^2$)*7 | 0.6 | 1.5 | 2.5 | 1.6 | 1.3 |
| Elongation (%)*7 | 420 | 370 | 300 | 360 | 470 |
| OI (oxygen index)*8 | 35 | 26 | 35 | 30 | 24 |
| Hydrogen halide gases (mg/g)*9 | 0 | 60 | 270 | 80 | 0 |
| Copper mirror corrosion test. corroded area (%)*10 | 0 | 15 | 100 | 21 | 0 |
| Mooney viscosity at 100° C.*11 | 26 | 22 | — | — | 23 |
| Smoke emission, D(m$^{-1}$)*12 | 0.6 | 2.8 | 2.5 | 2.2 | 0.7 |

*1, *3, *4 and *6–*12 Same as in TABLE 1;
*16 Same as in TABLE 3;
*17 A flame retardant containing 83 wt % bromine.

TABLE 5

| EXAMPLE | Conductor size | Insulation | Core tape | Filler | Hold-down tape | Sheath correspondg Example | Finish appearance extrd. skin | Combustion test results (IEEE Std. 383) Damage dist. (cm)* | Judgement | HCl gas conc. (ppm)** | Distance visible thru gases produced (m)*** |
|---|---|---|---|---|---|---|---|---|---|---|---|
| 15 | 3$^c$ × 5.5 mm$^2$ | EP rubber for insulation thickness t = 1 mm OI = 18 | — | paper | — | Ex. 6 t = 1.5 mm | good | 120 | acceptable | 0 | 200 or more |
| 16 | " | EP rubber for insulation thickness t = 1 mm OI = 18 | — | " | — | Ex. 2 t = 1.5 mm | good | 110 | acceptable | 0 | 130 |
| 17 | " | EP rubber for insulation thickness t = 1 mm OI = 26 | — | jute | — | Ex. 2 t = 1.5 mm | good | 110 | acceptable | 0 | 100 |
| 18 | " | EP rubber for insulation thickness t = 1 mm OI = 26 | Mylar tape | solid rubber OI = 45 | Mylar tape | Ex. 2 t = 1.5 mm | good | 90 | acceptable | 0 | 200 or more |
| 19 | " | EP rubber for insulation thickness t = 1 mm OI = 26 | — | paper | — | Ex. 8 t = 1.5 mm | good | 80 | acceptable | 0 | 150 |

Note:
*The length of the carbonized portion of the sheath tested;
**The concentration during combustion measured with a colormetric gas detector tube;
***The concentration of smoke during combustion measured in conformity with JIS A-1306 and represented by the distance visible through the gases produced. (m) = 2.7/D.

*16 Dimethylpolysiloxane.

TABLE 6

| COMPARATIVE EXAMPLE | Conductor size | Insulation | Core tape | Filler | Hold-down tape | Sheath correspondg Example | Finish appearance extrd. skin | Combustion test results (IEEE Std. 383) Damage dist. (cm)* | Judgement | HCl gas conc. (ppm)** | Distance visible thru gases produced (m)*** |
|---|---|---|---|---|---|---|---|---|---|---|---|
| 16 | 3$^c$ × 5.5 mm$^2$ | EP rubber for insulation thickness t = 1 mm OI = 26 | — | paper | — | Comp. Ex. 1 thickness t = 1.5 mm | good | all burnt | unacceptable | 0 | 100 |
| 17 | " | EP rubber for insulation thickness t = 1 mm | — | " | — | Comp Ex. 1 thickness t = 1.5 mm | good | all burnt | unacceptable | 0 | 100 |

TABLE 6-continued

| COMPARATIVE EXAMPLE | Conductor size | Insulation | Core tape | Filler | Hold-down tape | Sheath correspondg Example | Finish appearance extrd. skin | Combustion test results (IEEE Std. 383) | | | |
|---|---|---|---|---|---|---|---|---|---|---|---|
| | | | | | | | | Damage dist. (cm)* | Judgement | HCl gas conc. (ppm)** | Distance visible thru gases produced (m)*** |
| 18 | " | OI = 26 EP rubber for insulation thickness t = 1 mm | — | " | — | Comp. Ex. 2 thickness t = 1.5 mm | poor | 110 | acceptable | 0 | 200 or more |
| 19 | " | OI = 18 EP rubber for insulation thickness t = 1 mm | — | " | — | Comp. Ex. 7 thickness t = 1.5 mm | good | 100 | acceptable | 40 | 20 |
| 20 | " | OI = 18 EP rubber for insulation thickness t = 1 mm | — | " | — | Comp. Ex. 6 thickness t = 1.5 mm | good | 60 | acceptable | 220 | 30 |
| 21 | " | OI = 26 PVC for insulation thickness t = 1 mm OI = 23 | — | " | — | Comp. Ex. 7 thickness t = 1.5 mm | good | 60 | acceptable | 410 | 10 |

Note:
*,  and *Same as in TABLE 5

TABLE 7

| EXAMPLE | Conductor size | Insulation | Core tape | Filler | Hold-down tape | Sheath correspondg Example | Finish appearance extrd. skin | Combustion test results (IEEE Std. 383) | | | |
|---|---|---|---|---|---|---|---|---|---|---|---|
| | | | | | | | | Damage dist. (cm)* | Judgement | HCl gas conc. (ppm)** | Distance visible thru gases produced (m)*** |
| 20 | 3$^c$ × 5.5 mm$^2$ | EP rubber for insulation thickness t = 1 mm OI = 18 | — | paper | — | Ex. 9 t = 1.5 mm | good | 130 | acceptable | 0 | 170 |
| 21 | " | EP rubber for insulation thickness t = 1 mm OI = 18 | — | " | — | Ex. 12 t = 1.5 mm | good | 100 | acceptable | 0 | 110 |
| 22 | " | EP rubber for insulation thickness t = 1 mm OI = 26 | Mylar tape | solid rubber OI = 45 | Mylar tape | Ex. 9 t = 1.5 mm | good | 50 | acceptable | 0 | 200 or more |

*,  and *the same as in TABLE 5

TABLE 8

| COMPARATIVE EXAMPLE | Conductor size | Insulation | Core tape | Filler | Hold-down tape | Sheath correspondg Example | Finish appearance extrd. skin | Combustion test results (IEEE Std. 383) | | | |
|---|---|---|---|---|---|---|---|---|---|---|---|
| | | | | | | | | Damage dist. (cm)* | Judgement | HCl gas conc. (ppm)** | Distance visible thru gases produced (m)*** |
| 22 | 3$^c$ × 5.5 mm$^2$ | EP rubber for insulation thickness t = 1 mm OI = 26 | — | paper | — | Comp. Ex. 9 | good | 130 | acceptable | 0 | 30 |
| 23 | " | EP rubber for insulation thickness t = 1 mm OI = 18 | — | " | — | Comp. Ex. 11 | good | 100 | acceptable | 40 | 20 |
| 24 | " | EP rubber for insulation thickness t = 1 mm OI = 26 | — | " | — | Comp. Ex. 10 | good | 60 | acceptable | 220 | 30 |
| 25 | " | PVC for insulation thickness t = 1 mm OI = 23 | — | " | — | Comp. Ex. 11 | good | 60 | acceptable | 410 | 10 |

Note:
*,  and *Same as in TABLE 5

What is claimed is:

What is claimed is:

1. A flame-retardant composition prepared by mixing (1) 100 parts by weight of a halogen-free polymer, (2) about 50 to 200 parts by weight of magnesium hydroxide having an average particle diameter of about 0.3 to about 2 μm, (3) about 5 to about 50 parts by weight of carbon black powder having an oil absorption of about 0.5 to about 2.0 ml g$^{-1}$, (4) about 3 to about 10 parts by weight of an organopolysiloxane, and (5) about 3 to about 10 parts by weight of a basic lead compound of the formula xPbO·Pb(R)·yH$_2$O, in which $0 \leq x \leq 3$, R is a higher fatty acid group, an aromatic carboxylic acid group having 6 or more carbon atoms or a sulfuric acid group, and $0 \leq y \leq 10$, and then cross-linking the mixture obtained with an inorganic peroxide, sulfur, or a sulfur compound as a vulcanizing agent.

2. A flame-retardant composition prepared by mixing (1) 100 parts by weight a halogen-free polymer, (2) about 50 to about 200 parts by weight of magnesium hydroxide having an average particle diameter of about 0.3 to about 2 μm, (3) about 5 to about 50 parts by weight of carbon black powder having an oil absorption of about 0.5 to about 2.0 ml g$^{-1}$, (4) a flame-retardant containing red phosphorus in an amount such that the red phosphorus makes up about 2 to about 15 parts by weight per 100 parts by weight of the said halogen-free polymer, (5) about 3 to about 10 parts by weight of an organopolysiloxane, and (6) about 3 to about 10 parts by weight of a basic lead compound of the formula xPbO . Pb(R) . yH$_2$O, in which $0 \leq x \leq 3$, R is a higher fatty acid group, an aromatic carboxylic acid group having 6 or more carbon atoms or a sulfuric acid group, and $0 \leq y \leq 10$, and then cross-linking the mixture obtained with an organic peroxide, sulfur, or a sulfur compound as a vulcanizing agent.

3. A flame-retardant composition prepared by mixing (1) 100 parts by weight of a halogen-free polymer which is at least one member selected from the group consisting of polyethylenes, natural rubbers, butyl rubbers, silicone rubbers, ethylene propylene rubbers, ethylene propylene diene elastomers, ethylene-vinyl acetate copolymers, ethylene-ethyl acrylate copolymers, ethylene-α-olefin copolymers, ethylene acrylic elastomers, hydrogenated styrene-butadiene elastomers, polyester elastomers, and their blends, (2) about 50 to about 200 parts by weight of magnesium hydroxide having an average particle diameter of about 0.3 to about 2 μm, said magnesium hydroxide being surface-treated with stearic acid or oleic acid, (3) about 5 to about 50 parts by weight of carbon black powder having an oil absorption of about 0.5 to about 2.0 ml g$^{-1}$, and (4) a flame retardant containing red phosphorus in an amount such that the red phosphorus makes up about 2 to about 15 parts by weight, and then cross-linking the mixture with an organic peroxide, sulfur, or a sulfur compound as a vulcanizing agent.

4. The flame-retardant composition of claim 3, wherein the said halogen-free polymer is a polyolefin resin having an ethylene content of at least 90%.

5. The flame-retardant composition of claim 3, wherein the said mixture contains about 3 to about 10 parts by weight of an organopolysiloxane and about 3 to about 10 parts by weight of a basic lead compound of the formula xPbO.Pb(R).yH$_2$O, in which $0 \leq x \leq 3$, R is a higher fatty acid group, an aromatic carboxylic acid group having 6 or more carbon atoms or a sulfuric acid group, and $0 \leq y \leq 10$, per 100 parts by weight of the said halogen-free polymer.

6. The flame-retardant composition of claim 5, wherein the said organopolysiloxane is dimethylpolysiloxane, methylphenypolysiloxane or methylvinylpolysiloxane, and wherein the said basic lead compound is tribasic lead sulphate, dibasic lead phthalate or basic lead stearate.

7. The flame-retardant composition of claim 6, wherein the said polymer is a polyolefin resin having an ethylene content of at least 90%.

8. A flame-retardant composition prepared by mixing (1) 100 parts by weight of a halogen-free polymer which is at least one member selected from the group consisting of polyethylenes, nature rubbers, butyl rubbers, silicone rubbers, ethylene propylene rubbers, ethylene propylene diene elastomers, ethylene-vinyl acetate copolymers, ethylene-vinyl acetate copolymers, ethylene-ethyl acrylate copolymers, ethylene-α-olefin copolymers, ethylene acrylic elastomers, hydrogenated styrene-butadiene elastomers, polyester elastomers and their blends, (2) about 50 to about 200 parts by weight of magnesium hydroxide having an average particle diameter of about 0.3 to about 2 μm, said magnesium hydroxide being surface-treated with stearic acid or oleic acid, (3) about 5 to 50 parts by weight of carbon black powder having an oil absorption of about 0.5 to about 2.0 ml g$^{-1}$, (4) about 3 to about 10 parts by weight of an organopolysiloxane, and (5) about 3 to about 10 parts by weight of a basic lead compound of the formula xPbO.Pb(R).yH$_2$O, in which $0 \leq x \leq 3$, R is a higher fatty acid group, an aromatic carboxylic acid group having 6 or more carbon atoms or a sulfuric acid group, and $0 \leq y \leq 10$, and then cross-linking the mixture with an organic peroxide, sulfur, or a sulfur compound as a vulcanizing agent.

9. The flame-retardant composition of claim 8, wherein the said polymer is a polyolefin resin having an ethylene content of at least 90%.

10. The flame-retardant composition of claim 8, wherein the said organopolysiloxane is dimethylpolysiloxane, methylphenylpolysiloxane or methylvinylpolysiloxane, and wherein the said basic lead compound is tribasic lead sulfate, dibasic lead phthalate or basic lead stearate.

11. The flame-retardant composition of claim 10, wherein the said polymer is a polyolefin resin having an ethylene content of at least 90%.

12. A flame-retardant composition prepared by:
(a) mixing (1) 100 parts by weight of a halogen-free polymer which is at least one member selected from the group consisting of polyethylenes, ethylene propylene rubbers, ethylene propylene diene elastomers, ethylene-vinyl acetate copolymers, ethylene-ethyl acrylate copolymers, ethylene-α-olefin copolymers, ethylene acrylic elastomers, hydrogenated styrene-butadiene elastomers and their blends, (2) about 5 to about 200 parts of magnesium hydroxide having an average particle diameter of about 0.3 to about 2 μm, said magnesium hydroxide being surface-treated with stearic acid or oleic acid, (3) about 5 to about 50 parts of carbon black powder having an oil absorption of about 0.5 to about 2.0 ml g$^{-1}$, and (4) a flame retardant containing red phosphorus in an amount such that the red phosphorus makes up about 2 to about 15 parts by weight, and
(b) then cross-linking the mixture with an organic peroxide, sulfur, or a sulfur compound as a vulcanizing agent.

13. The flame-retardant composition of claim 12, wherein the said polymer is a polyolefin resin having an ethylene content of at least 90%.

14. The flame-retardant composition of claim 12, wherein the said mixture contains about 3 to about 10 parts by weight of an organopolysiloxane, and about 3 to about 10 parts by weight of a basic lead compound of the formula $xPbO.Pb(R).yH_2O$, in which $0 \leq x \leq 3$, R is a higher fatty acid group, an aromatic carboxylic acid group having 6 or more carbon atoms or a sulfuric acid group, and $0 \leq y \leq 10$, per 100 parts by weight of the said halogen-free polymer.

15. The flame-retardant composition of claim 14, wherein the said organopolysiloxane is dimethylpolysiloxane, methylphenylpolysiloxane or methylvinylpolysiloxane, and wherein the said basic lead compound is tribasic lead sulfate, dibasic lead phthalate or basic lead stearate.

16. The flame-retardant composition of claim 15, wherein the said polymer is a polyolefin resin having an ethylene content of at least 90%.

17. A flame-retardant composition prepared by:
  (a) mixing (1) 100 parts by weight of a halogen-free polymer which is at least member selected from the group consisting of polyethylenes, ethylene propylene rubbers, ethylene propylene diene elastomers, ethylene-vinyl acetate copolymers, ethylene-ethyl acrylate copolymers, ethylene-α-olefin copolymers, ethylene acrylic elastomers, hydrogenated styrene-butadiene elastomers and their blends, (2) about 50 to about 200 parts by weight of magnesium hydroxide having an average particle diameter of about 0.3 to about 2 $\mu$m, said magnesium hydroxide being surface-treated with stearic acid or oleic acid, (3) about 5 to about 50 parts of carbon black powder having an oil absorption of about 0.5 to about 2.0 ml $g^{-1}$, (4) about 3 to about 10 parts by weight of an organopolysiloxane, and (5) about 3 to about 10 parts by weight of a basic lead compound of the formula $xPbO.Pb(R).yH_2O$, in which $0 \leq x \leq 3$, R is a higher fatty acid group, an aromatic carboxylic group having six or more carbon atoms or a sulfuric acid group, and $0 \leq y \leq 10$, and
  (b) then cross-linking the mixture with an organic peroxide, sulfur, or a sulfur compound as a vulcanizing agent.

18. The flame-retardant composition of claim 17, wherein the said polymer is a polyolefin resin having an ethylene content of at least 90%.

19. The flame-retardant composition of claim 17, wherein the said organopolysiloxane is dimethylpolysiloxane, methylphenylpolysiloxane or methylvinylpolysiloxane and wherein the said basic lead compound is tribasic lead sulfate, dibasic lead phthalate, or basic lead stearate.

20. The flame-retardant composition of claim 17, wherein the said polymer is a polyolefin resin having an ethylene content of at least 90%.

* * * * *

UNITED STATES PATENT AND TRADEMARK OFFICE
CERTIFICATE OF CORRECTION

PATENT NO. : 4,671,896
DATED : June 9, 1987
INVENTOR(S) : MASATAKE HASEGAWA ET AL It is certified that error appears in the above-identified patent and that said Letters Patent is hereby corrected as shown below:

Claim 1, line 15, replace "inorganic" with --organic--.
Claim 12, line 56, replace "5" with --50--.

Signed and Sealed this

Seventh Day of June, 1988

Attest:

DONALD J. QUIGG

Attesting Officer

Commissioner of Patents and Trademarks